(12) United States Patent
Long

(10) Patent No.: US 6,733,282 B2
(45) Date of Patent: May 11, 2004

(54) TORCH FUEL DELIVERY SYSTEM AND BURNER

(75) Inventor: Norris Richard Long, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 70 days.

(21) Appl. No.: 10/140,542

(22) Filed: May 7, 2002

(65) Prior Publication Data

US 2003/0211435 A1 Nov. 13, 2003

(51) Int. Cl.[7] ................................................ F23D 14/28
(52) U.S. Cl. ........................ 431/344; 431/345; 431/12
(58) Field of Search .............................. 431/344, 345, 431/247, 12

(56) References Cited

U.S. PATENT DOCUMENTS

| 400,602 | A | * | 4/1889 | Rotton | 431/247 |
| 3,721,516 | A | * | 3/1973 | Reese | 431/202 |
| 5,083,916 | A | * | 1/1992 | Glennon et al. | 431/344 |
| 5,647,738 | A | * | 7/1997 | Tsai | 431/255 |
| 5,902,101 | A | * | 5/1999 | Palmer et al. | 431/202 |

FOREIGN PATENT DOCUMENTS

| GB | 2225101 | * | 5/1990 |
| JP | 11162203 | * | 6/1999 |

* cited by examiner

Primary Examiner—Alfred Basichas
(74) Attorney, Agent, or Firm—Leydig, Voit & Mayer, Ltd.

(57) ABSTRACT

A fuel delivery system and burner for a torch. Fuel passes from a regulator into a tube that extends through the path of a flame that is produced by the burner. The tube preferably is shaped into a coil around the area of the flame so that the coil is heated by the flame. The heated coil assures that liquid fuel in the coil is vaporized as it passes through the coil. In addition, the coil may act as a flame spreader. A burner tube includes an internal passage and an outer passage. Fuel vapor flows through each of these passages, and escapes the burner tube at a distal end. The outer flow of gas is slow, and does not aspirate air, causing the flame to remain attached to the burner and to burn yellow. The inner flow of gas adds velocity, helping the burner flame to be wind resistant.

10 Claims, 4 Drawing Sheets

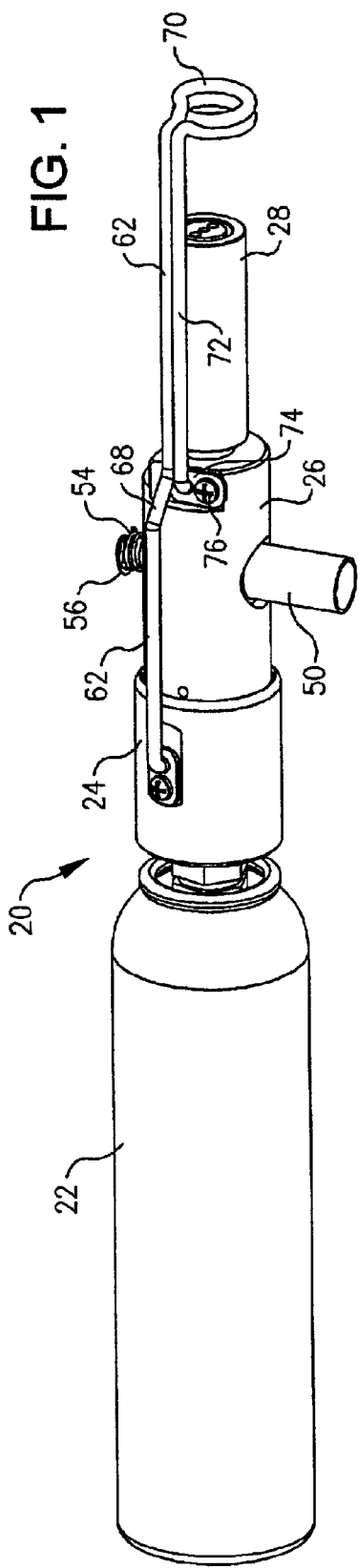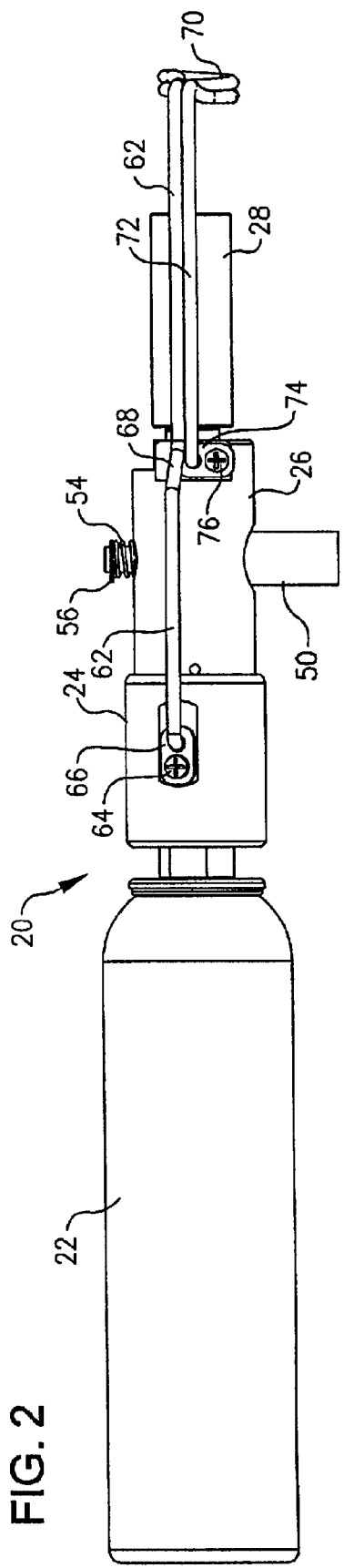

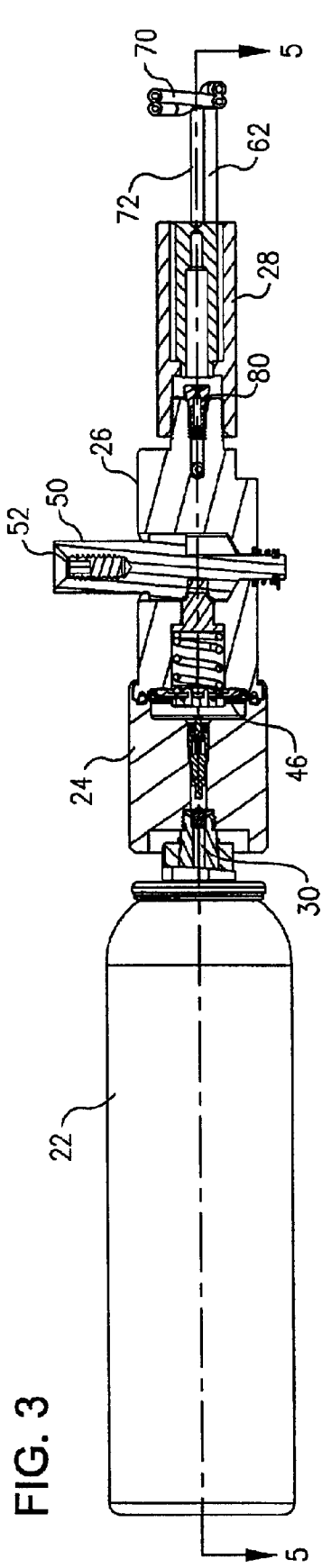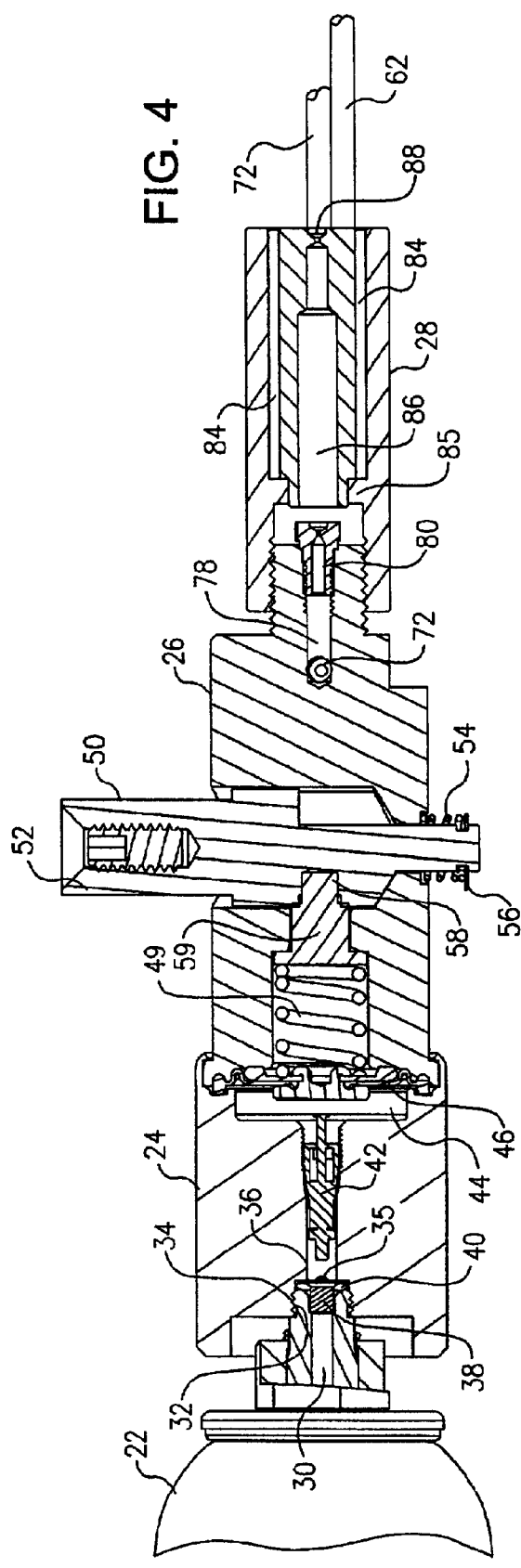
FIG. 3
FIG. 4

TORCH FUEL DELIVERY SYSTEM AND BURNER

TECHNICAL FIELD OF THE INVENTION

This invention relates generally to combustion devices, and more specifically to torches.

BACKGROUND OF THE INVENTION

The relay of the Olympic torch is a tradition of the modern day Olympics. The first Olympic torch relay traveled from Olympia, Greece to Berlin, Germany as part of the 1936 Opening Ceremony. The torch passed through seven countries and the relay was completed solely by runners. A torch relay has been held, in one form or another, at every Olympics since.

For modern day Olympic torch relays, several thousand participants may act as torch-bearers along the torch relay. For example, in the 2002 Salt Lake City Olympics, over 11,000 torch-bearers carried some form of torch over a 13,500-mile circuitous trek that covered 46 states in the United States. The relay lasted 65 days, and in addition to running torch-bearers, torches were carried by automobile, airplane, train, ship, dogsled, skiers, horse-drawn sleigh, snowmobile, ice skaters, and various other forms of transportation.

For the 2002 Salt Lake City Games, each running torch-bearer ran or walked with a torch an average of two-tenths of a mile. Because the torch-bearers often like to keep their torches as a souvenir, each torch-bearer often uses his or her own torch. This may cause a problem, in that the torches need to look the same, and burn the same, over the entire torch relay. Ideally, during the entire trek of each torch-bearer, a respective torch-bearer's torch needs to remain lit while emitting a bright yellow, consistently-sized flame. In addition, torches need to continue to remain lit through all types of weather, including rain and temperatures as low as negative 20 degrees Fahrenheit. Finally, the stable, consistent flame must be maintained as fuel in the torch is consumed.

SUMMARY OF THE INVENTION

The present invention provides a fuel delivery system and burner that is suitable for an Olympic torch. The fuel delivery system and burner may be used for other torches, for example, tiki torches.

In accordance with one aspect of the present invention, the fuel delivery system includes a regulator mounted in a torch body and in fluid communication with a fuel supply, such as a fuel canister or tank. The regulator maintains the fuel exiting the fuel canister at a substantially constant pressure within a regulator cavity.

Fuel passes from the regulator cavity into a tube, or conduit, that extends through the path of a flame that is produced by the burner. The tube preferably is shaped into a coil around the area of the flame so that the coil is heated by the flame. The heated coil assures that liquid fuel in the coil is vaporized as it passes through the coil. In addition, the coil may act as a flame spreader, giving the flame a much larger, fuller appearance. The tube and therefore the fuel flow continue through and beyond the coil and into the top of the torch body.

The heated coil and tube are preferably formed of a thermally conductive material, such as brass or copper. In addition, the torch body is also made of a thermally conductive material. In this manner, the heat on the coil may be transferred to the torch body, permitting the torch body to remain heated during operation of the burner. In this manner, the regulator may vaporize some or all of the fuel before it even enters the tube. In addition, the heat from the tube heats the torch body to overcome the cooling caused by vaporization of the fuel.

If some liquid passes into the tube, the routing of the fuel through the flame via the coil assures that all fuel is vaporized before it reenters the top of the torch body. When the fuel flows through the tube and into the top of the torch body, it enters a gas tip chamber. A gas tip is seated in the top portion of the chamber, and is configured to regulate a flow of the vaporized fuel into a burner tube.

In accordance with one aspect of the present invention, the burner tube includes an internal passage and an outer passage. Fuel vapor flows through each of these passages, and escapes the burner tube at a distal end. The outer flow of gas is slow, and does not aspirate air, causing the flame to remain attached to the burner and to burn yellow. The inner flow of gas adds velocity, helping the burner flame to be wind resistant. This inner flow of vapor fuel does not draw in air because it is surrounded by the vapor fuel flow from the outer flow. The resultant flame is soft yellow, stays attached to the burner, does not draw in air, and still has a good velocity away from the burner, and thus is wind resistant.

Other advantages will become apparent from the following detailed description when taken in conjunction with the drawings, in which:

BRIEF DESCRIPTION OF THE DRAWINGS

FIG. 1 is a side perspective view of a torch incorporating a fuel delivery system and burner in accordance with the present invention;

FIG. 2 is a side view of the torch of FIG. 1;

FIG. 3 is a side partial sectional view of the torch of FIG. 1, taken along the section lines 3—3 of FIG. 5;

FIG. 4 is a partial sectional view, similar to FIG. 3, but enlarged to show detail;

DETAILED DESCRIPTION

Figure 5:
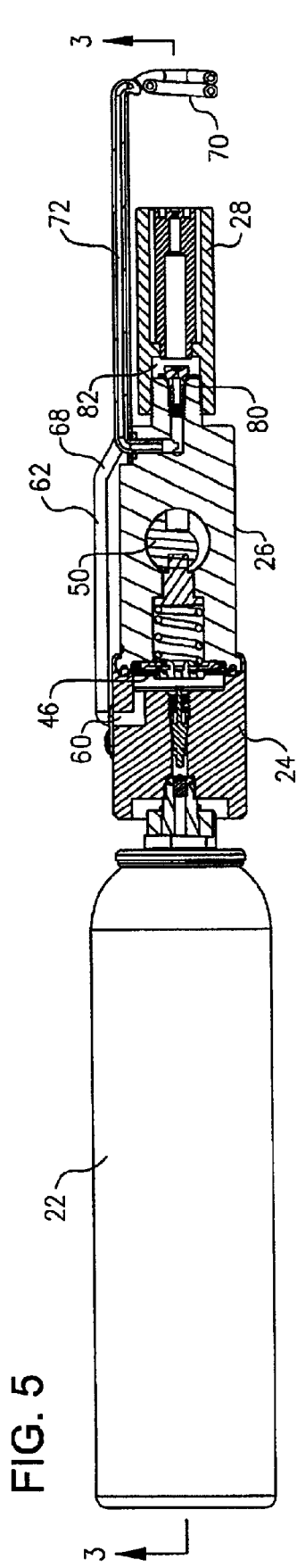
FIG. 5 is a side partial sectional view of the torch of FIG. 1, taken along the section lines 5—5 of FIG. 3.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "rear," "trailing," and the like, the orientations are to aid the reader in understanding the invention, and are not meant to be limiting.

Referring now to the drawings, in which like reference numerals represent like parts throughout the several views, FIG. 1 shows a torch 20 incorporating a fuel delivery system and burner in accordance with the present invention. The torch includes a fuel cartridge 22, which may be a tank, canister, or other fuel container such as known in the art. The fuel cartridge 22 may be, for example, made of aluminum.

A regulator body 24 is attached to the fuel cartridge 22 and extends beyond the end of the fuel cartridge. A valve body 26 is attached to the regulator body 24. Together these two components make up the torch body or housing of the torch 20. A burner tube 28 is attached to the end of the valve body 26. Each of the fuel cartridge 22, the regulator body 24, the valve body 26, and the burner tube 28 are aligned linearly in the embodiment shown in the drawing, but other arrangements may be used. However, the embodiment shown works particularly well for use as a torch, because the components may all fit within, and thus be hidden by, an elongate shroud or other structure that has an appearance of a torch.

In the embodiment shown, the forward end of the regulator body 24 is cast around, press fit, or otherwise attached around the trailing end of the valve body 26. This connection is preferably airtight, and allows thermal conduction between the two parts. The regulator body 24 and the valve body 26 are preferably formed of thermally conductive material, such as aluminum. The significance of the use of the thermally conductive material is described below.

Referring now to FIG. 4, the fuel cartridge 22 includes a dip tube 30 that extends into a neck on the fuel cartridge. The neck includes external threads 32 that are threaded into internal threads 34 inside the trailing end of the regulator body 24. The internal threads 34 are located just rearward of a restrictor orifice 35 that is located at the rear of a restrictor cavity 36. If desired, the dip tube 30 may include a filter 38 at a distal end. An O-ring 40 may be used to seal the connection between the neck of the fuel cartridge 22 and the restrictor orifice 35.

A valve core 42 is situated in the forward end of the restrictor cavity 36. Just beyond the valve core 42, the restrictor cavity 36 opens to a regulator cavity 44. In the embodiment shown, the regulator cavity 44 is defined between the leading end of the regulator body 24 and the trailing end of the valve body 26, but the regulator cavity may be located anywhere in the housing of the torch 20.

A diaphragm 46 is located within regulator cavity 44 and extends out of the trailing end of the valve body 26. The diaphragm 46 is of a construction that is known in the art, and is biased into the regulator cavity 44 by a spring 49. During operation, the diaphragm 46 is configured to maintain a substantially constant pressure of fuel within the regulator cavity 44, and thus functions as a regulator in a manner known in the art.

A valve switch 50 extends through the valve body 26 and is configured to open and close the diaphragm 46 in a manner known in the art. In the embodiment shown in the drawings, the valve switch 50 includes a set screw 52 that allows the valve switch to be rotated. Rotation of the valve switch 50 causes a cam (not shown, but known in the art) to engage a protrusion 58 on the end of a cam follower 59 and to move the diaphragm 46 further into the regulator cavity 44 and toward the restrictor orifice 35. Rotation in the opposite direction causes the diaphragm to move toward the valve body 26 end of the regulator cavity 44. The valve switch 50 is held in the valve body 26 by a spring 54 and an E-ring 56.

Figure 6:
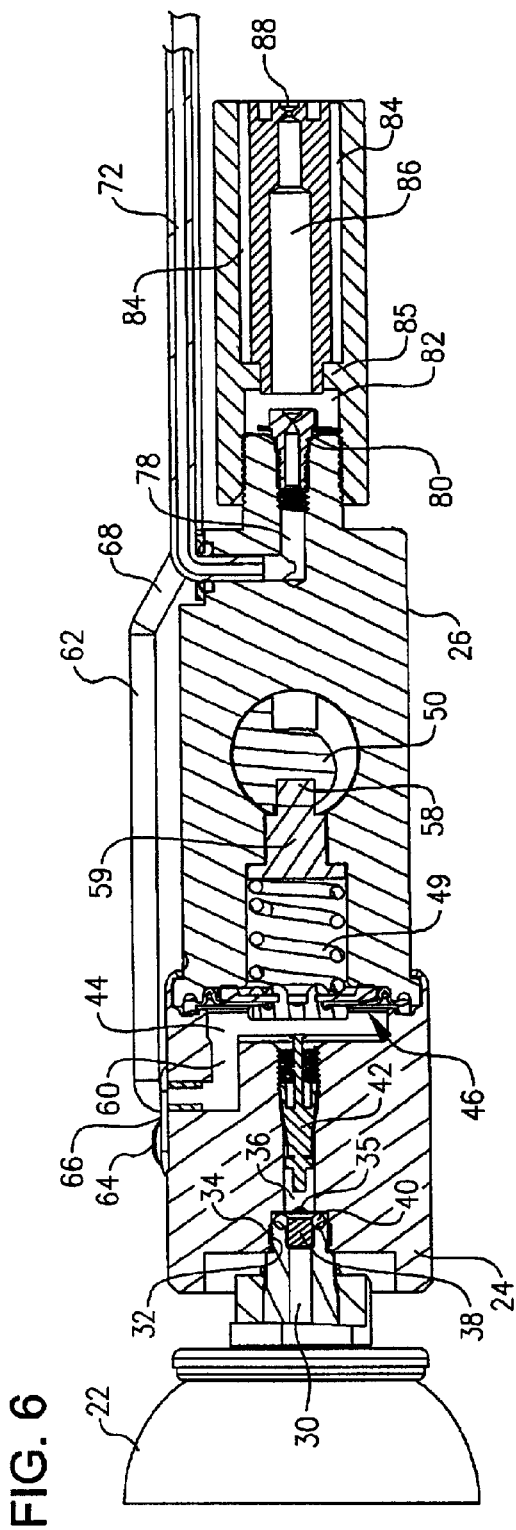
FIG. 6 is a partial sectional view, similar to FIG. 5, but enlarged to show detail.

As can be seen in FIG. 6, an internal passageway 60 extends from the regulator cavity 44 to outside of the regulator body 24. A tube 62 extends into the external opening of the internal passageway 60. The end of the tube 62 may be held within the internal passageway 60, for example by a screw 64 and a retainer plate 66. The tube then bends at a right angle and extends along the regulator body 24 and the valve body 26. The tube 62 turns at an elbow 68 to run alongside and adjacent to the burner tube 28. The tube 62 continues beyond the end of the burner tube 28 where it turns and forms a pair of coils 70. The tube 62 then continues along a return 72 and extends into an internal cavity 78 in the leading end of the valve body 26. The return 72 may be held within the cavity 78 for example by a retainer plate 74 and a screw 76.

The internal cavity 78 extends into the valve body 26 and bends at a right angle to extend longitudinally along the valve body. A gas tip 80, such as known in the art, is located at the distal end of the cavity 78. The burner tube 28 is threaded onto and fits over the gas tip 80.

Figure 7:
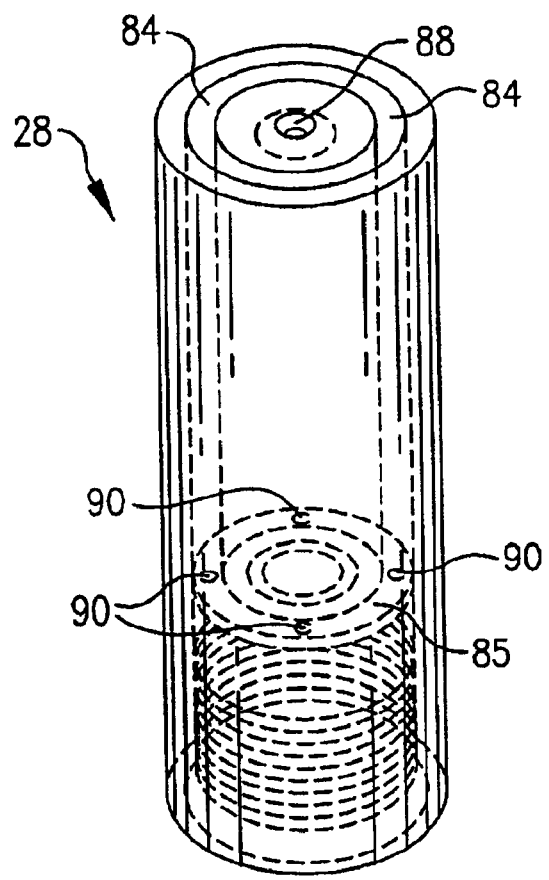
FIG. 7 is a side perspective view of a burner tube for the torch of FIG. 1.
Figure 8:
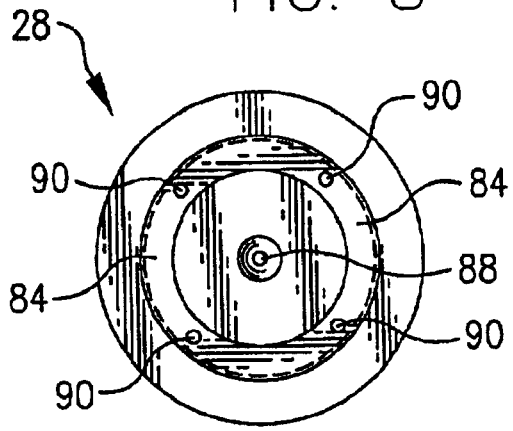
FIG. 8 is a top view of the burner tube of FIG. 7.

Details of the burner tube 28 can be seen in FIGS. 6–8. The burner tube includes an annular cavity 84 that extends around an internal portion of the outer part of the burner tube 28. In the embodiment shown, the annular cavity 84 is shaped like a cylinder. A flange 85 closes most of the rearward end of the annular cavity 84, and the forward end of the annular cavity opens to ambient. The flange 85 includes four outer orifices 90 that extend from the fuel cavity 82 into the annular cavity 84. An inner cavity 86 (FIG. 6) extends coaxially with the annular cavity 84 and inside of the annular cavity 84. The inner cavity 86 includes a single exit through a central orifice 88.

In general, the present invention provides at least two different features which contribute to the torch 20 being able to provide a stable, consistent flame. First, the present invention provides a fuel delivery system including the regulator, the tube 62 and the coils 70. Second, the present invention provides the unique configuration of the burner tube 24 which prevents aspiration of air at the tip of the burner tube, and provides a yellow flame that is windproof. Each of these aspects is further discussed below.

In use, the fuel canister 22 is filled with a fuel, such as a blend of propylene and butane that is self pressurized. Other fuels, such as propane or other blends, may be used. Before starting, the valve switch 50 is in the off position, at which the spring diaphragm 48 is pressed against and seals off the restrictor orifice 35. The valve core 42 may also be closed by being pressed by the spring diaphragm 48.

To light the torch 20, the valve switch 50 is rotated, causing the cam to move the diaphragm 46 to an open position. Fuel may then flow from the fuel canister 22 to the regulator cavity 44 through the restrictor orifice 35. The amount of fuel that flows out of the restrictor cavity 36 is controlled by the valve core 42. The fuel then flows through the tube 62 and into the internal cavity 78.

The diaphragm 46 is preferably configured so as to maintain fuel pressure in the regulator cavity 44 at around four pounds per square inch. Fuel within the regulator cavity 44 passes into the tube 62 and travels along the tube 62 to the coils 70. Upon initial start, all of the parts of the torch 20 are cold, and the flow of fuel, which is at least partly liquid, is controlled by the valve core 42. This mixture of liquid and vapor fuel, at least initially, passes through the regulator cavity 44 into the tube 62 and through coils 70 and is eventually ignited (e.g., by a match) at the distal end of the burner tube.

The coils 70 are located such that flames coming out of the burner tube 28 extend through and heat the coils 70.

When the torch 20 has been operating for a few seconds, the heat from the flame coming out of the burner tube 28 transfers through the coils 70, and the heated coils cause vaporization of the fuel in the coils. The coils 70 ensure that the fuel is completely vaporized before it enters the valve body 26. This feature ensures the best burning results in the burner tube 28.

Fuel that is vaporized in the coils 70 travels along the return 72 and enters the cavity 78. The gas tip 80 regulates the amount of fuel that enters the burner tube 28, for example at 12500 BTU/hour. The operation of the burner tube 28 is described further below.

The heated coils 70 raise the temperature of the valve body 26 and the regulator body 24 via conductive transfer of heat. In addition, the heated gas that flows from the coils 70 and into the top of the valve body 26 heats the the valve body through convention. That is, when the torch 20 is burning, the gas that is heated in the coils 70 and that enters the forward end of the valve body 26 transfers some heat to the valve body. Preferably, this heat is transferred to the regulator and the regulator body 24. To aid in heat transfer, each of the components of the torch body is preferably formed of a heat conductive material, such as aluminum.

Heat is also transferred via the connection of the coils 70 to the regulator body 24. To further enhance heat transfer, the conduit for the flow of fuel from the regulator to the gas tip (in the shown embodiment, the tube 62, the coils 70, and the return 72) may be formed from brass, copper or a similarly heat conductive, easily formed and shaped material.

The raised temperature of the regulator body 24 causes much of the fuel in the regulator cavity 44 to be vaporized before it enters the tube 62. In fact, the heat causes some of the fuel to be vaporized as it leaves the restrictor orifice 35. This feature is beneficial, because the diaphragm 46 performs better with only vapor in the regulator cavity 44.

The burner tube 28 is configured so as to provide a stable, consistent flame. The four outer orifices 90 deliver a gentle flow of gas through the annular cavity 84. This gentle flow of gas flows out of the forward end of the burner tube 28, but does not aspirate air. Because air is not mixed with the fuel, a yellow flame may be provided at the end of the burner tube 28. Because the flow of fuel is slow out of the annular cavity 84, the flame stays attached to the burner. By attached, we mean that the flame appears to have little or no gap between it and the burner tube 28.

The flame created by the fuel flow out of the annular cavity 84 is not sufficient, however, to remain burning in higher winds. Because the flow of fuel is slow, a high wind may extinguish the flame. To solve this problem, the central orifice 88 adds velocity to the gas flow. However, the flow of gas out of the central orifice 88 does not draw in air because it is surrounded by burning gas that flows from the annular cavity 84.

The coils 70 are preferably positioned so that they enhance the flame by broadening the flame and serving as a flame spreader. A person skilled in the art may position and configure the coils 70 to provide this effect. In the present embodiment, the coils 70 are spaced from the end of the burner tube 24 approximately one inch, and the coils are approximately one inch in diameter. However, the coils 70 or any other structure of the tube (or another appropriate fuel conduit) may be arranged appropriately so that the tube or conduit is in the path of a flame produced by the burner, which may be beyond the visible end of the flame, or adjacent to the visible portion of the flame.

In the present invention, the annular cavity is one half inch in outer diameter and three eighths inch in inner diameter. In addition, the fuel flow into the annular cavity 84 is four times the flow of fuel through the central orifice 88. That is, the pressure of the vapor fuel in the fuel cavity is constant, and thus the flow through each of the four outer orifices 90 would be substantially the same as the flow out of the central orifice 88 (assuming they are all the same size). In the shown embodiment, the diameter of each of the orifices 88, 90 is 25 thousandths of an inch. The fuel flow emitted out of the distal end the annular cavity 84 is much slower than the fuel flow out of the central orifice, because the fuel vapor flowing into the annular cavity can spread in the annular cavity before exiting at the distal end. Thus, the flow of fuel vapor is spread over a larger area, causing a slower flow of the gas. This feature provides slow fuel vapor flow out of the annular cavity, although the total amount of fuel exiting the annular cavity at one time is 4 times that exiting the central orifice 88.

A person of skill in the art may alter each of the above dimensions to produce a desired flame, but preferably the burner tube 28 is arranged to provide a slower fuel vapor flow at a perimeter, and a faster fuel vapor flow at a central location. The annular cavity 84 and the central orifice 88 may be sized and positioned to provide a different flame pattern than the torch 20 of the described embodiment, but the described embodiment works particularly well for producing a flame that burns bright yellow and remains attached to the burner tube 28.

The fuel delivery system of the present invention provides a consistent flow of fuel regardless of changes in temperatures or fuel levels within the fuel canister 22. The constant conduction and convection of heat to the valve body 26 and the regulator body 24 aid in vaporization of fuel and provide a constant flow of fuel to the coils 70. The resultant heat transfer offsets outside temperature variations as well as the endothermic reaction caused by vaporization of fuel in the regulator cavity 44, and the cooling effect of the vaporization and the heating effect of the convection and conduction causes equilibrium to be established in the regulator cavity 44, aiding in a constant flow of vaporized fuel to the gas tip 80.

The burner tube 28 utilizes the constant flow of fuel from the gas tip 80 and provides a stable, consistent flame, regardless of wind changes. The slow flow of fuel out of the annular cavity 84 causes the flame to stay attached to the burner and does not draw in air. The velocity of the flow of vaporized fuel out of the central orifice 88 provides shape for the flame, and also prevents the flame from being extinguished because of wind.

Many variations of the described torch are possible depending upon desired flame height and color. The described torch operates at a 12500 BTU flow rate, but other flow rates may be used.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A torch, comprising:

a burner;

a fuel inlet;

a conduit that extends between the fuel inlet and the burner, the conduit arranged so that it extends in the path of a flame that is created by the burner;

a regulator between the conduit and the fuel inlet, the regulator being mounted in a housing, and the burner being attached to the housing, and the housing comprising a thermally conductive material so that a flame produced by the burner may heat the regulator.

2. The torch of claim 1, wherein the conduit is attached to the housing and is formed of a thermally conductive material so that a flame produced by the burner may heat the conduit and the heated conduit may heat the housing and the regulator.

3. The torch of claim 2, wherein the conduit enters the housing so that fuel heated as it passes through a portion of the conduit in the path of a flame created by the burner may enter the housing and heat the housing and the regulator.

4. The torch of claim 1, wherein the conduit enters the housing so that fuel heated as it passes through a portion of the conduit in the path of a flame created by the burner may enter the housing and heat the housing and the regulator.

5. The torch of claim 1, wherein the conduit forms at least one coil in the path of the flame.

6. The torch of claim 5, wherein the coil is arranged and configured to act as a flame spreader.

7. A torch, comprising:

a burner comprising a burner tube, the burner tube comprising:

a first fuel passage for emitting a first flow of fuel vapor at a first flow rate;

a second fuel passage for emitting a second flow of fuel vapor at a second rate, the second rate being greater than the first;

a fuel inlet; and a conduit that extends between the fuel inlet and the burner, the conduit arranged so that it extends in the path of a flame that is created by the burner.

8. The torch of claim 7, wherein the second fuel passage is at least partly surrounded by the first fuel passage.

9. The torch of claim 8, wherein the first fuel passage completely surrounds the second fuel passage.

10. The torch of claim 7, wherein the second fuel passage and the first fuel passage are configured so that a flame created by the burner remains attached to the burner tube.

* * * * *